United States Patent
Alpman et al.

(10) Patent No.: US 10,126,871 B2
(45) Date of Patent: Nov. 13, 2018

(54) METHOD AND DEVICE OPERATING AN ELECTRONIC DEVICE IN A VEHICLE VIA A TOUCHSCREEN THROUGH FILTERING

(71) Applicant: FORD GLOBAL TECHNOLOGIES, LLC, Dearborn, MI (US)

(72) Inventors: Erik Alpman, Aachen (DE); Christoph Arndt, Moerlen (DE); Rainer Busch, Aachen (DE); Urs Christen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 14/910,925

(22) PCT Filed: Jul. 31, 2014

(86) PCT No.: PCT/EP2014/066480
§ 371 (c)(1),
(2) Date: Feb. 8, 2016

(87) PCT Pub. No.: WO2015/018732
PCT Pub. Date: Feb. 12, 2015

(65) Prior Publication Data
US 2016/0188113 A1 Jun. 30, 2016

(30) Foreign Application Priority Data
Aug. 9, 2013 (DE) ......... 10 2013 215 742

(51) Int. Cl.
*G06F 3/041* (2006.01)
*G06F 3/01* (2006.01)
(Continued)

(52) U.S. Cl.
CPC ............ *G06F 3/0418* (2013.01); *G06F 3/017* (2013.01); *G06F 3/0488* (2013.01);
(Continued)

(58) Field of Classification Search
CPC ...... G06F 3/0418; G06F 3/0488; G06F 3/017; G06F 3/0414; G06F 3/0416;
(Continued)

(56) References Cited

U.S. PATENT DOCUMENTS 5,659,271 A * 8/1997 Tanabe ............ H03L 1/00
331/10
7,865,838 B2 1/2011 Feig et al.
(Continued)

FOREIGN PATENT DOCUMENTS

| | | |
|---|---|---|
| DE | 112009002612 T5 | 8/2012 |
| EP | 2160675 A1 | 3/2010 |
| EP | 2587350 A2 | 5/2013 |

OTHER PUBLICATIONS

Chen, Z. et al. (Mar. 1, 2007). Correlative Learning: A Basis for Brain and Adaptive Systems. John Wiley & Sons (hereinafter "Chen"), Retrieved from URL http://onlinelibrary.wiley.com/doi/10.1002/9780470171455.app1/pdf on Aug. 28, 2017.*
(Continued)

Primary Examiner — Darlene M Ritchie
(74) Attorney, Agent, or Firm — Frank MacKenzie; Brooks Kushman P.C.

(57) ABSTRACT

A method for operating an electronic device via a touchscreen, wherein the operation is carried out on the basis of a position signal generated by an input movement touching the touchscreen, includes carrying out a filtering of the position signal in such a way that at least one movement component of the input movement is at least partially suppressed, wherein a filtered position signal is obtained, and actuating the electronic device on the basis of this filtered position signal.

13 Claims, 3 Drawing Sheets

(51) Int. Cl.
*G06F 3/0488* (2013.01)
*G06F 3/0481* (2013.01)

(52) U.S. Cl.
CPC .... *B60K 2350/1028* (2013.01); *G06F 3/0414* (2013.01); *G06F 3/04817* (2013.01)

(58) Field of Classification Search
CPC ... G06F 3/04817; G01C 21/3664; B62D 1/04; B60K 2350/1028
See application file for complete search history.

(56) References Cited

U.S. PATENT DOCUMENTS

| | | | |
|---|---|---|---|
| 8,373,669 B2 | 2/2013 | Miernik | |
| 9,442,619 B2* | 9/2016 | Geyer | B60K 35/00 |
| 9,489,052 B2* | 11/2016 | Saka | G06F 3/017 |
| 2008/0289887 A1* | 11/2008 | Flint | G06F 3/0414 |
| | | | 178/18.03 |
| 2010/0103100 A1* | 4/2010 | Yamamoto | G06F 3/038 |
| | | | 345/158 |
| 2010/0328351 A1 | 12/2010 | Tan | |
| 2011/0141066 A1 | 6/2011 | Shimotani et al. | |
| 2011/0242064 A1* | 10/2011 | Ono | B60K 35/00 |
| | | | 345/184 |
| 2012/0308204 A1 | 12/2012 | Hwang | |
| 2013/0024071 A1* | 1/2013 | Sivertsen | B60K 35/00 |
| | | | 701/41 |
| 2013/0201117 A1* | 8/2013 | Yeung | G06F 3/0418 |
| | | | 345/173 |
| 2013/0249869 A1* | 9/2013 | Voss | G06F 3/0418 |
| | | | 345/178 |
| 2014/0009430 A1* | 1/2014 | Italia | G06F 3/044 |
| | | | 345/174 |
| 2014/0082676 A1* | 3/2014 | Barowski | B60K 37/06 |
| | | | 725/75 |
| 2014/0331129 A1* | 11/2014 | Saeki | G06F 3/016 |
| | | | 715/702 |
| 2014/0354574 A1* | 12/2014 | Hirabayashi | G06F 3/041 |
| | | | 345/173 |
| 2015/0104030 A1* | 4/2015 | Ueno | G10K 11/178 |
| | | | 381/71.4 |
| 2016/0361020 A1* | 12/2016 | LeBoeuf | G16H 40/63 |

OTHER PUBLICATIONS

Hill, Arthur V. (Jul. 21, 2011). The Encyclopedia of Operations Management, Print ISBN-10 0-13-288370-8. p. 22, 47 (Year: 2011).*
International Search Report for PCT Application No. PCT/EP2014/066480, dated Oct. 7, 2014, 9 pgs.

* cited by examiner

METHOD AND DEVICE OPERATING AN ELECTRONIC DEVICE IN A VEHICLE VIA A TOUCHSCREEN THROUGH FILTERING

CROSS-REFERENCE TO RELATED APPLICATIONS

This application is the National Stage of International Application No. PCT/EP2014/066480, filed Jul. 31, 2014, which claims priority to DE Patent Application No. 10 2013 215 742.8, filed Aug. 9, 2013, the disclosures of which are incorporated in their entirety by reference herein.

The invention relates to a method and an operating unit for operating an electronic device, particularly in a vehicle, via a touchscreen.

For the development of more clearly arranged instrument panels in motor vehicles, it is known to use a touch-sensitive screen or touchscreen while avoiding prescribed, purpose-built buttons on the dashboard, said touchscreen providing virtual buttons or operating panels depending on the function required by the driver.

Figure 2:
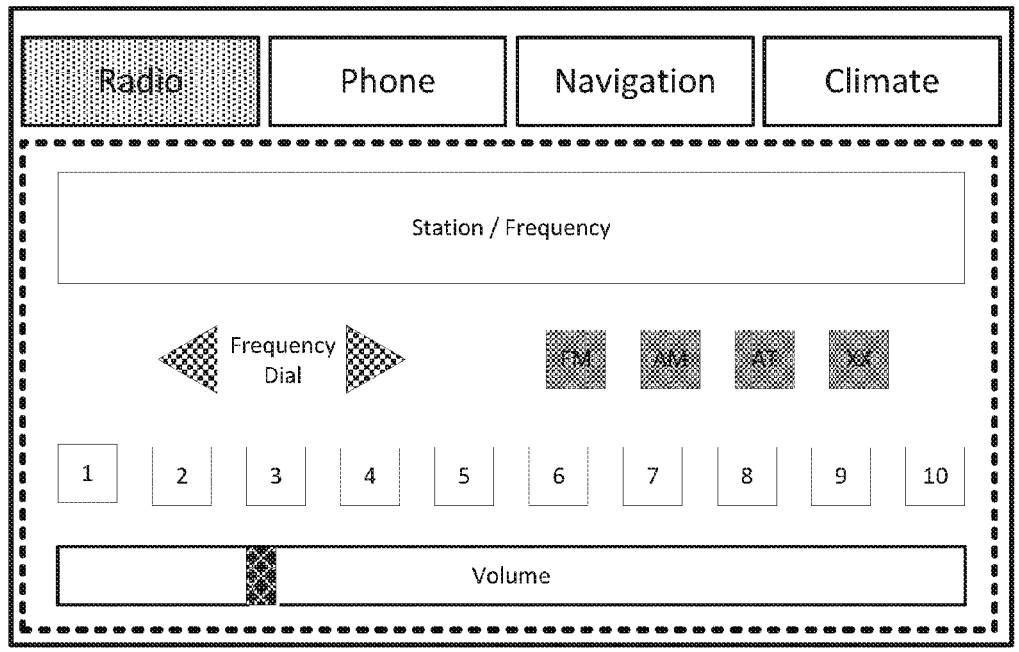
Figure 2:
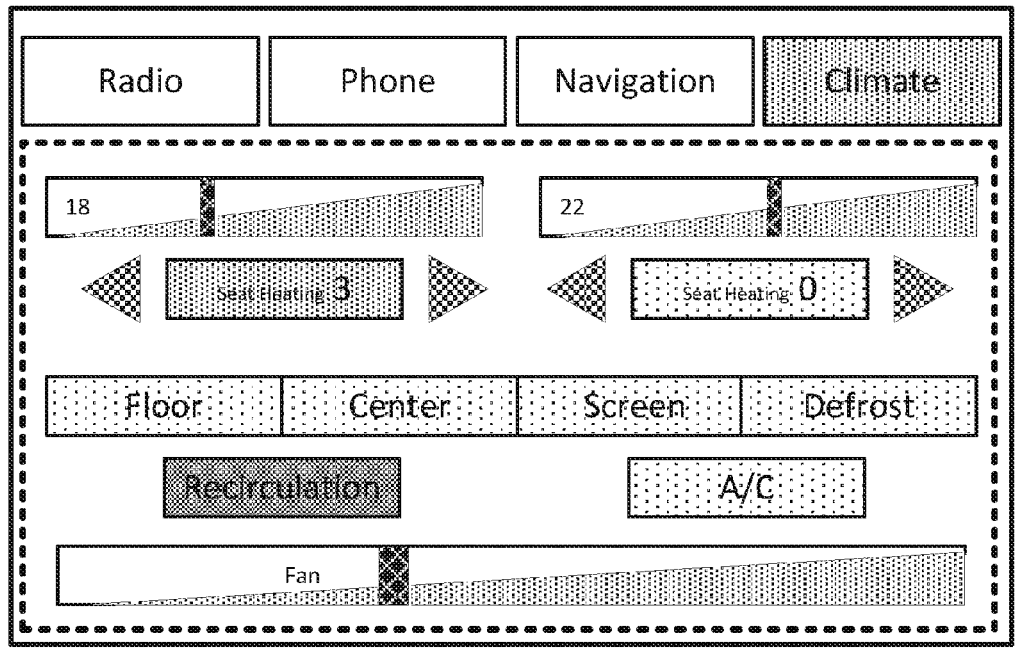

Thus, for example, as shown in FIG. 2, a first row of buttons can be located on a touchscreen for selecting the respective function (e.g. "Radio", "Navigation" or "Climate control"), wherein, under this first row, an area is provided which is variable according to the selected function and provides suitable information or input buttons according to the selected function. The area bordered by a dotted line in FIG. 2 is adapted according to the function that has just been selected by the driver.

In practice, the problem can occur here that these virtual buttons may be very small if the area provided by the touchscreen or available for input fields is heavily used, so that its exact actuation can be difficult. The problem is further exacerbated given that touchscreens of this type are frequently arranged in the central area of the dashboard (referred to as the "center stack"), which may result in parallax errors and may have the consequence that the user actuates the touchscreen outside the center of the actually intended operating panel.

Figure 3:
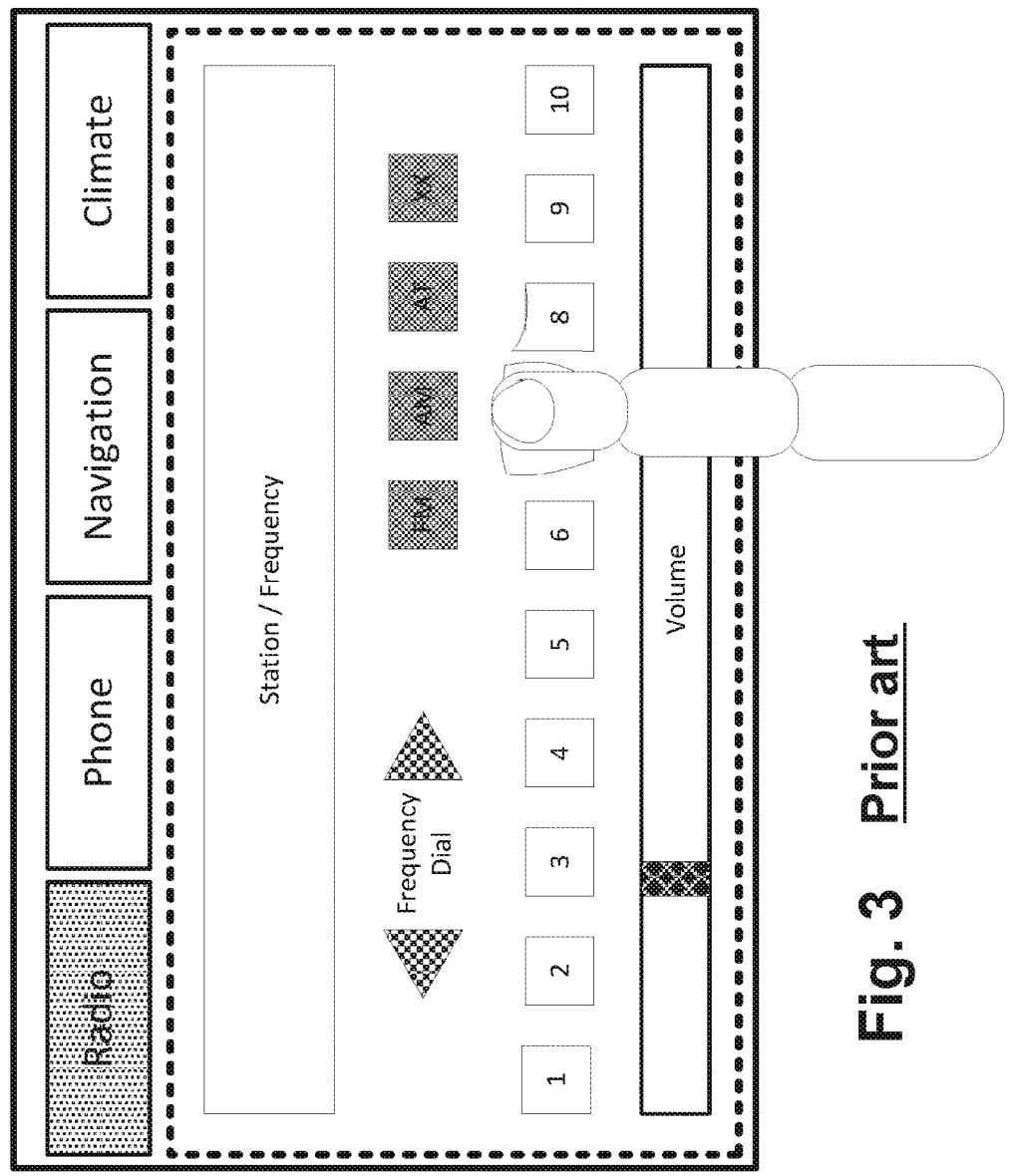

To overcome this problem, according to the schematic representation shown in FIG. 3, the image shown by the touchscreen can be enlarged in the area around the contact point of the finger, so that the user receives visual feedback relating to the respectively actuated area. This visual feedback replaces the haptic feedback familiar from conventional buttons and confirms to the user that the intended change to the respective settings is also achieved.

However, even in the case of the approach described with reference to FIG. 3, the further problem occurs that a certain movement of the hand or finger of the driver always takes place during the journey, so that a steady alignment of the finger without shaking is difficult. However, an unsteady or shaking movement of the finger results in a roaming or jumping around of the respectively enlarged area and a flickering of the display. This problem is exacerbated in that, when a touchscreen located in the central operating area or center stack of the dashboard is actuated, the extended arm of the driver is moved or positioned in a different manner than in the case of actuation of a tablet computer held in the respective other hand. Furthermore, the movement of the vehicle also results in relative movements between the extended finger and the touchscreen. The actuation of a required operating panel on the touchscreen in a vehicle can therefore prove to be significantly more difficult than the actuation of a tablet computer or smartphone.

Furthermore, due to the finger movement taking place in three dimensions or spatial directions, a sudden change can take place in the enlargement and the enlarged area before the targeted area on the touchscreen is finally hit, which has the result that the display apparently flickers and the location and actuation of the targeted point or operating panel is further hindered.

A method for actuating a touchscreen in the cockpit of an aircraft, inter alia, is known from EP 2 587 350 A2, in which valid touchscreen inputs are determined on the basis of the comparison between a characteristic of the respective input with a reference characteristic. Here, for example, inputs during the occurrence of turbulence are categorized as accidental or are regarded as invalid, this possibly being achieved, for example, on the basis of the detection of biomechanical characteristics (e.g. relating to the hand area or wrist) of the inputs or the size of the actuated area in relation to the average fingertip size.

It is known from DE 11 2009 002 612 T5 that the position inputs of a touchscreen are subjected to a low-pass filtering with a constant filter constant or limit frequency (e.g. 3 Hz) for the elimination of vibrations. However, a constant low-pass filtering of this type results in an unwanted sluggishness of the display.

With regard to the further prior art, reference is merely made by way of example to US 2012/0308204 A1, U.S. Pat. No. 7,865,838 B2, EP 2 160 675 B1, US 2010/0328351 A1 and U.S. Pat. No. 8,373,669 B2.

One object of the present invention is to provide a method and an operating unit for operating an electronic device via a touchscreen, particularly in a vehicle, which enable a more precise operation with minimal errors, even in the case of irregular or sudden input movements or finger movements of the operating person, wherein the impression of a sluggish display response for the user is intended to be avoided.

This object is achieved by the method according to the features of independent patent claim 1 and the operating unit according to the features of subordinate patent claim 11.

A method according to the invention for operating an electronic device via a touch screen, particularly in a vehicle, wherein the operation is carried out on the basis of a position signal generated by an input movement touching the touchscreen, has the following steps:

carrying out a filtering of the position signal in such a way that at least one movement component of the input movement is at least partially suppressed, wherein a filtered position signal is obtained; and actuating the electronic device on the basis of this filtered position signal.

The invention is based particularly on the concept of subjecting the position signals (e.g. of the respective finger position) resulting from a hand or finger movement approaching and finally touching the touchscreen to a filtering, wherein the filter parameters used herein can be selected according to the current vehicle state (e.g. vehicle speed and acceleration). The invention is based on the notion that the finger movement intended by the driver is overlaid by random or statistical movement components, as will be described in further detail below.

The touchscreen may be a touchscreen installed in the vehicle or the touchscreen of a tablet computer or smartphone (e.g. connected to a vehicle). However, the invention is not restricted to these applications and can generally be advantageously implemented in applications in which a touchscreen is intended to be actuated in a mobile environment, if necessary even at a substantial distance or with an extended arm of the operating person.

According to one embodiment, the at least one movement component of the input movement comprises an irregular movement (e.g. in the sense of a movement back and forth, a shaking movement or "Brownian motion") of the hand of an operating person extended to perform the input movement.

According to one embodiment, the at least one movement component of the input movement comprises vibration-induced relative movements, in particular due to vibrations of the vehicle, between the hand extended to perform the input movement and the touchscreen.

According to one embodiment, the at least one movement component of the input movement comprises movements due to steering or braking operations of a vehicle and/or due to unevenness of the road surface.

According to one embodiment, the position signal has three location coordinates (x, y, z) relative to the touchscreen, wherein the position signal is filtered for all of these three location coordinates.

According to one embodiment, the at least one movement component is determined on the basis of an autocorrelation of the position signal.

According to one embodiment, the at least one movement component is determined using a low-pass filter.

According to one embodiment, the at least one movement component is determined using at least one acceleration sensor.

According to one embodiment, the position signal is frozen if a position change determined during the input movement or an acceleration determined during the input movement exceeds a predefined threshold value.

According to one embodiment, visual and/or haptic feedback is conveyed to a person carrying out the input movement in response to an input movement touching the touch screen.

The invention furthermore relates to an operating unit for operating an electronic device via a touchscreen, particularly in a vehicle, wherein the operation is performed on the basis of a position signal generated by an input movement touching the touchscreen, and wherein the operating unit is configured to carry out a method with the features described above.

Further designs of the invention can be found in the description and the subclaims.

Figure 1:
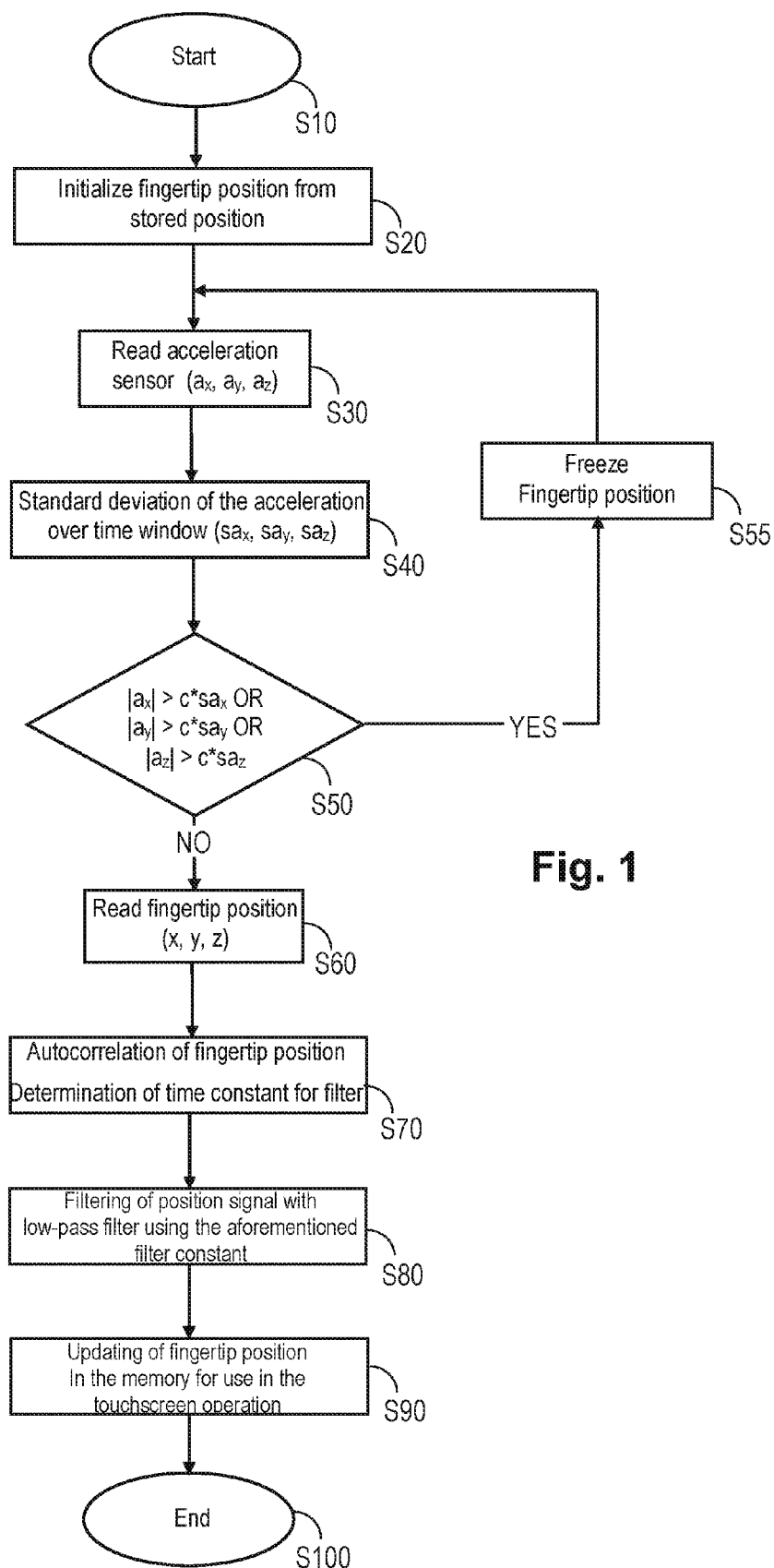

The invention is explained in detail below using an example embodiment, with reference to the attached drawings, in which:

FIG. 1 shows a flow diagram to explain an example of the sequence of the method according to the present invention, and FIGS. 2-3 show a schematic representation to explain conventional approaches to the operation of a touchscreen.

The invention is based on the notion that, during the operation of a touchscreen, e.g. in a vehicle, the finger movement intended by the driver is overlaid by random or statistical movement components, wherein at least four movement components can be distinguished in terms of the relative movement between the fingertip and the touchscreen:

the movement intended by the driver, i.e. approaching the touchscreen and pointing to a defined area or point (referred to below as "component a");

a "Brownian motion" in the form of slight movements, e.g. due to the circumstance that the hand may be held extended and not in a completely constant position or because the driver is operating the steering wheel with his other hand and is performing compensatory movements with the extended hand (referred to below as "component b");

random or statistical, slight movements due to vibrations of the vehicle and their effect on both the touchscreen and the driver (referred to below as "component c"); and unintentional, more substantial movements due to sudden steering or braking operations or unevenness of the road surface (referred to below as "component d").

These components of the relative movement taking place overall can be measured in different ways and can have different frequency ranges and different statistical characteristics.

The intended movement (=component a)) can be extracted by means of a "strong" filtering, since this involves the average or mean movement component around which the remaining movement components oscillate. However, in a conventional filtering using a slow low-pass filter to eliminate all unwanted movement components, delays occur which may be troublesome to the driver and may cause the display to appear very sluggish.

The Brownian motion component (component b)) is evident from the position information which is detected by the touchscreen (e.g. by means of cameras or a different sensor technology). The statistical characteristics of this Brownian motion component can be determined with an autocorrelation or cross-correlation which indicates the time after which the correlation of the position signal becomes lost in itself (so that a corresponding low-pass filter can eliminate the uncorrelated, faster contributions). These statistical characteristics are dependent on the driver (e.g. muscle tension), but also on the acceleration. By adapting the filter to the detected statistical characteristics, the filtering can be adapted to the driver so that the impairments described above can be avoided.

The corresponding adaptation of the low-pass filter can be performed by using the output value of the correlation calculation directly as a filter constant with a suitable scaling factor. For example, in the case of a weakly autocorrelated (i.e. normally "more abrupt" position signal), a more quickly responding filter is preferably used than in the case of a more strongly autocorrelated signal in which a stronger filtering is performed. A filtering with an adapted filter constant is preferably performed, at least in the operating mode in which the position signal is not "frozen", so that an optimum suppression of the "Brownian" motion component and an optimum response speed of the input are simultaneously achieved.

Alternatively, the adaptation of the filter constant may only be gradual, i.e. may follow the correlation signal only with a certain delay. This means that the filter constant itself is subjected in turn to an additional low-pass filtering, preferably with a predefined filter constant), as a result of which, inter alia, interference effects can be eliminated in the case of strongly transient states.

As an alternative to the modifications described above based on the correlation or cross-correlation, the filter constant can also be modified on the basis of an evaluation of the signals of an acceleration sensor.

The respectively considered time shift between the functions constitutes a parameter in the calculation of the autocorrelation or cross-correlation of time-dependent functions. The value zero can be selected for this time shift, or a specific time delay can be specified.

Alternatively, the autocorrelation or cross-correlation can also be used directly instead of the low-pass filtering to define corrected position values, since the use of the correlation operation is also accompanied by an averaging.

The slight, stochastic or random movements (=component c)) can be determined by means of acceleration sensors of the type available e.g. in vehicles and numerous other devices respectively provided with a touchscreen. The statistical characteristics of the acceleration signal can be evaluated in order to determine the standard deviation over short time windows. This information can be used in the consideration or processing of the fourth movement component described below.

For most of the time, there is no need to filter the third component (component c)) with a filter designed specifically for this purpose, since the double integration taking place between the acceleration signal and the position signal normally eliminates all high-frequency stochastic contributions. If a filtering is nevertheless required for this third movement component (component c)), a Fourier transform can be applied to the acceleration signal in order to determine the frequency range in which (apart from the contribution of the equilibrium state) the largest contribution takes place. This frequency range is generally dependent on the vehicle speed, the type of road and, where relevant (if settable or available), the setting of the suspension ("hard/sport" or "soft/comfort"). A notch filter can be used to eliminate the corresponding frequency range from the position information of the fingertip.

The fourth movement component (=component d)), which relates to the unintentional movements due to unevenness of the road surface, can be determined by comparing the acceleration sensor signal with the previously determined standard deviation. If the signal lies outside a range of e.g. ±3 standard deviations, an unevenness of the road surface or a sudden steering movement results in a significant movement of the hand. In this case, any changes in the fingertip position are preferably suppressed for a specific time period. The duration of this suppression may be time-based and may, for example, be 500 ms. Alternatively, the duration of this suppression of changes in the fingertip position can also be determined on the basis of the acceleration itself. The position determination can thus be resumed as soon as the acceleration lies within a smaller range (e.g. ±1 standard deviations) for a specific number of sampling times. Furthermore, the suppression can also be carried out depending on the evaluation of the Brownian motion if, for example, the autocorrelation has once more attained its original value. A further possibility lies in the evaluation of the cross-correlation between the acceleration and the position, wherein the position tracking can be resumed if the cross-correlation indicates a sufficient decoupling between the two signals (i.e. a low cross-correlation).

The filtering according to the invention is preferably carried out not only in two dimensions (i.e. for the x and y direction on the touchscreen), but also for the third dimension or location coordinate or spatial direction (z direction), in particular the approach to the touchscreen. In particular, the case may occur where a first-time actual touching of the touchscreen is caused by one of the three unintentional movement components described above (components b)-d)) and not by the intentional movement (component k), so that the action associated with the touching should also be delayed in a manner similar to that of the (x, y position) on the touchscreen.

In order to support the driver additionally in the manipulation or actuation of the symbols shown on the touchscreen, feedback is preferably additionally conveyed if the touching has been recognized and accepted. This may involve visual feedback (for example through illumination or color change of the symbol touched by the driver (e.g. button or slide switch). In further embodiments, haptic feedback (e.g. in the form of a vibration of the surface) or audible feedback can be conveyed, indicating that the touching of the screen has been recognized (wherein, in this case, no information relating to the actuated element is conveyed).

In alternative embodiments, comparatively large, sudden changes in the position of the fingertip can be evaluated instead of the acceleration measurement described above with reference to the third and fourth movement components (components c) and d)). As a result, the circumstance is exploited wherein intentional movements take place comparatively constantly or gradually, whereas unintentional movements take place relatively suddenly. A gradual statistic as described in connection with the acceleration signal can be used.

A possible sequence of the method according to the invention is described below with reference to the flow diagram shown in FIG. 1.

After the start of the method (step S10), the fingertip position is initialized from a stored position in step S20. The acceleration sensor (i.e. the acceleration signal ($a_x$, $a_y$, $a_z$)) is read in step S30.

In step S40, the standard deviation of the acceleration ($sa_x$, $sa_y$, $sa_z$) is determined over a specific time window. If, according to the interrogation in the following step S50, the contribution of at least one of the acceleration components is greater than the product of the respective standard deviation with a predefined factor, the fingertip position is "frozen" (step S55) with a return to step S30, i.e. a further reading of the acceleration sensor. Otherwise, the fingertip position is read in the three spatial directions, i.e. the coordinates (x, y, z), in step S60. In the following step S70, the fingertip position is autocorrelated and the time constants are determined for the filtering. The position signal is then filtered in step S80 using a low-pass filter on the basis of the corresponding filter constants. In step S90, the fingertip position is updated in the memory for use in the touchscreen actuation. The method ends in step S100.

The invention claimed is:

1. A method for operating an electronic device via a touchscreen in a vehicle, comprising:
    generating an intended position signal by an input movement touching the touchscreen, wherein the input movement is overlaid by unintended movement components;
    filtering the position signal to remove at least two of the unintended movement components to obtain a filtered position signal, wherein the filtering comprises
        removing a Brownian motion component by adapting a filter constant of a low-pass filter associated with the filtering depending on a result of a cross-correlation of the position signal and a variable selected according to an acceleration sensor signal of the vehicle,
        removing a component due to a vehicle vibration through a double integration of the acceleration sensor signal and the position signal or by applying a notch filter to a Fourier transform of the acceleration sensor signal, and
        removing a component due to sudden driver operations or road surface unevenness by comparing the acceleration sensor signal with a previously determined standard deviation; and
    actuating the electronic device on a basis of the filtered position signal.

2. The method as claimed in claim 1, wherein the unintended movement components comprise an irregular movement of a hand of an operating person extended to perform the input movement.

3. The method as claimed in claim 1, wherein the unintended movement components comprise vibration-induced relative movements, due to vibrations of the vehicle, between a hand of an operating person extended to perform the input movement and the touchscreen.

4. The method according to claim 1, wherein the unintended movement components comprise movements due to steering or braking operations of the vehicle or due to unevenness of a road surface.

5. The method as claimed in claim 1, wherein the position signal has three location coordinates relative to the touchscreen, and wherein the position signal is filtered for each of the three location coordinates.

6. The method as claimed in claim 1, wherein the position signal is frozen in response to a position change determined during the input movement or an acceleration determined during the input movement exceeding a predefined threshold value.

7. The method as claimed in claim 1, wherein visual or haptic feedback is conveyed to a person carrying out the input movement in response to the input movement touching the touchscreen.

8. A method for operating an electronic device via a touchscreen in a vehicle, comprising:

generating an intended position signal by an input movement touching the touchscreen, wherein the input movement is overlaid by unintended movement components;

filtering the position signal to remove at least two of the unintended movement components to obtain a filtered position signal, wherein the filtering comprises removing a Brownian motion component by adapting a filter constant of a low-pass filter associated with the filtering depending on a result of a cross-correlation of the position signal and a variable selected according to an acceleration sensor signal of the vehicle, and removing a component due to vehicle vibration through a double integration of the acceleration sensor signal and the position signal or by applying a notch filter to a Fourier transform of the acceleration sensor signal; and actuating the electronic device on a basis of the filtered position signal.

9. The method as claimed in claim 8, wherein the position signal is frozen in response to a position change determined during the input movement or an acceleration determined during the input movement exceeding a predefined threshold value.

10. The method as claimed in claim 8, wherein visual or haptic feedback is conveyed to a person carrying out the input movement in response to the input movement touching the touchscreen.

11. A method for operating an electronic device via a touchscreen in a vehicle, comprising:

generating an intended position signal by an input movement touching the touchscreen, wherein the input movement is overlaid by unintended movement components;

filtering the position signal to remove at least two of the unintended movement components to obtain a filtered position signal, wherein the filtering comprises removing a Brownian motion component by adapting a filter constant of a low-pass filter associated with the filtering depending on a result of a cross-correlation of the position signal and a variable selected according to an acceleration sensor signal of the vehicle, and removing a component due to sudden driver operations or road surface unevenness by comparing the acceleration sensor signal with a previously determined standard deviation and suppressing any changes in position for a specific time period; and actuating the electronic device on a basis of the filtered position signal.

12. The method as claimed in claim 11, wherein the position signal is frozen if a position change determined during the input movement or an acceleration determined during the input movement exceeds a predefined threshold value.

13. The method as claimed in claim 11, wherein visual or haptic feedback is conveyed to a person carrying out the input movement in response to the input movement touching the touchscreen.

* * * * *